United States Patent
Bifulco

(10) Patent No.: US 12,188,409 B2
(45) Date of Patent: Jan. 7, 2025

(54) GAS TURBINE ENGINE WITH ACOUSTIC LINER

(71) Applicant: RTX Corporation, Farmington, CT (US)

(72) Inventor: Anthony R. Bifulco, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 73 days.

(21) Appl. No.: 17/495,461

(22) Filed: Oct. 6, 2021

(65) Prior Publication Data

US 2023/0103861 A1  Apr. 6, 2023

(51) Int. Cl.
  *F02C 7/045*  (2006.01)
  *B64D 33/02*  (2006.01)
  *F01D 25/24*  (2006.01)

(52) U.S. Cl.
  CPC ............ *F02C 7/045* (2013.01); *F01D 25/243* (2013.01); *B64D 33/02* (2013.01); *B64D 2033/0206* (2013.01); *F05D 2260/30* (2013.01); *F05D 2260/96* (2013.01); *F05D 2300/603* (2013.01)

(58) Field of Classification Search
  CPC ....... F02C 7/045; F01D 25/243; B64D 33/02; B64D 2033/0206
  See application file for complete search history.

(56) References Cited

U.S. PATENT DOCUMENTS

| 4,293,053 | A | 10/1981 | Shuttleworth et al. |
| 6,857,669 | B2 | 2/2005 | Porte et al. |
| 8,028,802 | B2 | 10/2011 | Durchholz et al. |
| 10,619,565 | B2 * | 4/2020 | Todorovic ............. F01D 25/243 |
| 11,066,994 | B2 | 7/2021 | Porte et al. |
| 2004/0007422 | A1 * | 1/2004 | Porte ..................... F01D 25/243 181/210 |
| 2010/0084507 | A1 * | 4/2010 | Vauchel .................... F02C 7/04 244/1 N |
| 2010/0232932 | A1 * | 9/2010 | Vauchel ................. B64D 33/02 415/119 |

(Continued)

FOREIGN PATENT DOCUMENTS

WO  WO-2014197053 A2 * 12/2014  ............. B64D 33/02

OTHER PUBLICATIONS

Extended European Search Report for EP Application No. 22200083.8, dated Mar. 9, 2023, pp. 1-8.

*Primary Examiner* — Brian Christopher Delrue
(74) *Attorney, Agent, or Firm* — CANTOR COLBURN LLP

(57) ABSTRACT

An assembly for a gas turbine engine has: a fan case with a forward end, an aft end, and an inner surface extending from the forward end of the fan case to the aft end of the fan case; an acoustic liner having a forward end, an aft end, and an acoustic liner body that extends continuously from the forward end of the acoustic liner to the aft end of the acoustic liner; an inlet case located forward of the forward end of the fan case, the forward end of the acoustic liner being secured to the inlet case, and wherein the acoustic liner body is positioned against an inner surface of the inlet case and an inner surface of the fan case, and the aft end of the acoustic liner is secured to the fan case between the forward end and the aft end of the fan case.

14 Claims, 6 Drawing Sheets

(56) References Cited

U.S. PATENT DOCUMENTS

| | | | | |
|---|---|---|---|---|
| 2013/0048414 | A1* | 2/2013 | Gaudry | B64D 33/02 |
| | | | | 181/213 |
| 2015/0023780 | A1* | 1/2015 | Costa | F04D 29/526 |
| | | | | 415/170.1 |
| 2015/0125286 | A1* | 5/2015 | Suciu | F01D 25/28 |
| | | | | 415/201 |
| 2015/0276223 | A1* | 10/2015 | Benson | F01D 25/28 |
| | | | | 29/889.22 |
| 2020/0298987 | A1* | 9/2020 | Evans | B64D 33/02 |
| 2022/0356839 | A1* | 11/2022 | LaBelle | F02C 7/045 |

* cited by examiner

GAS TURBINE ENGINE WITH ACOUSTIC LINER

BACKGROUND

Embodiments of the present disclosure pertain to gas turbine engines and more specifically to a gas turbine engine with an acoustic liner that extends between the inlet case and fan cases.

The engine inlet case (or inlet cowl) and fan case may be a challenge to acoustically treat due to a structural segmentation of acoustic liners between inlet case and the fan case. Such structural segmentation of the acoustic liners may also result in flow path interface, introducing flow disturbances upstream of the fan.

BRIEF DESCRIPTION

Disclosed is an assembly for a gas turbine engine, including: a fan case, the fan case having a forward end, an aft end, and an inner surface extending from the forward end of the fan case to the aft end of the fan case; an acoustic liner having a forward end, an aft end, and an acoustic liner body that extends continuously from the forward end of the acoustic liner to the aft end of the acoustic liner; an inlet case located forward of the forward end of the fan case, the forward end of the acoustic liner being secured to the inlet case, and wherein the acoustic liner body is positioned against an inner surface of the inlet case and an inner surface of the fan case, and the aft end of the acoustic liner is secured to the fan case between the forward end and the aft end of the fan case.

In addition to one or more of the disclosed features for the assembly, the inner surface of the fan case defines a forward portion and an aft portion, wherein the forward portion of the fan case extends toward the forward end of the fan case and is axially forward of a fan that is surrounded by the fan case, and the aft portion of the fan case extends toward the aft end of the fan case and is axially aligned with the fan; and a retaining ring is connected to the inner surface of the fan case in the forward portion of the fan case, wherein the aft end of the acoustic liner and the retaining ring engage each other to restrict motion of the aft end of the acoustic liner.

In addition to one or more of the disclosed features for the assembly, the aft end of the acoustic liner has an end surface that defines a lead-in chamfer via a frustoconical shape having an aft taper; and the retaining ring has a forward end, and a retaining ring body that extends from the forward end of the retaining ring to an aft end of the retaining ring, wherein the forward end of the retaining ring has a retaining ring groove with a frustoconical shape that is configured to receive the aft end of the acoustic liner.

In addition to one or more of the disclosed features for the assembly, a damper is bonded to the retaining ring groove and disposed between the retaining ring groove and the aft end of the acoustic liner.

In addition to one or more of the disclosed features for the assembly, a forward gap is defined between the aft end of the acoustic liner and the damper; and a potting compound is disposed in the forward gap, to thereby fill the forward gap.

In addition to one or more of the disclosed features for the assembly, the assembly includes: a rub strip is connected to the inner surface of the fan case, the rub strip including a forward end, and a rub strip body that extends to the aft end of the fan case; the retaining ring is axially adjacent to the forward end of the rub strip, wherein an aft gap is defined between the retaining ring and the forward end of the rub strip; and the potting compound is disposed in the aft gap, to thereby fill the aft gap.

In addition to one or more of the disclosed features for the assembly, the retaining ring is bonded to the fan case; or the fan case and retaining ring are a unitary structure formed of a composite.

In addition to one or more of the disclosed features for the assembly, spacer shims are disposed between the acoustic liner and the fan case to define a radial gap between the acoustic liner body and the fan case; and the spacer shims are axially discrete and axially spaced apart from each other along the acoustic liner.

A gas turbine engine is disclosed, including: a fan; a fan case that surrounds the fan, the fan case having a forward end, an aft end, and an inner surface extending from the forward end of the fan case to the aft end of the fan case; an acoustic liner having a forward end, an aft end, and an acoustic liner body that extends continuously from the forward end of the acoustic liner to the aft end of the acoustic liner; an inlet case located forward of the forward end of the fan case, the forward end of the acoustic liner being secured to the inlet case, and wherein the acoustic liner body is positioned against an inner surface of the inlet case and an inner surface of the fan case, and the aft end of the acoustic liner is secured to the fan case between the forward end and the aft end of the fan case.

In addition to one or more of the disclosed features for the engine, the inner surface of the fan case defines a forward portion and an aft portion, wherein the forward portion of the fan case extends toward the forward end of the fan case and is axially forward of a fan that is surrounded by the fan case, and the aft portion of the fan case extends toward the aft end of the fan case and is axially aligned with the fan; and a retaining ring is connected to the inner surface of the fan case in the forward portion of the fan case, wherein the aft end of the acoustic liner and the retaining ring engage each other to restrict motion of the aft end of the acoustic liner.

In addition to one or more of the disclosed features for the engine, the aft end of the acoustic liner has an end surface that defines a lead-in chamfer via a frustoconical shape having an aft taper; and the retaining ring has a forward end, and a retaining ring body that extends from the forward end of the retaining ring to an aft end of the retaining ring, wherein the forward end of the retaining ring has a retaining ring groove with a frustoconical shape that is configured to receive the aft end of the acoustic liner.

In addition to one or more of the disclosed features for the engine, a damper is bonded to the retaining ring groove and disposed between the retaining ring groove and the aft end of the acoustic liner.

In addition to one or more of the disclosed features for the engine, a forward gap is defined between the aft end of the acoustic liner and the damper; and a potting compound is disposed in the forward gap, to thereby fill the forward gap.

In addition to one or more of the disclosed features for the engine, the engine includes a rub strip is connected to the inner surface of the fan case, the rub strip including a forward end, and a rub strip body that extends to the aft end of the fan case; the retaining ring is axially adjacent to the forward end of the rub strip, wherein an aft gap is defined between the retaining ring and the forward end of the rub strip; and the potting compound is disposed in the aft gap, to thereby fill the aft gap.

In addition to one or more of the disclosed features for the engine, the engine includes the retaining ring is bonded to the fan case; or the fan case and retaining ring are a unitary structure formed of a composite.

In addition to one or more of the disclosed features for the engine, spacer shims are disposed between the acoustic liner and the fan case to define a radial gap between the acoustic liner body and the fan case; and the spacer shims are axially discrete and axially spaced apart from each other along the acoustic liner.

In addition to one or more of the disclosed features for the engine, the aft end of the inlet case defines an aft flange, the aft flange has an aft guide aperture; the forward end of the fan case defines a forward flange, the forward flange has a forward guide aperture; and a guide pin extends through the aft guide aperture and the forward guide aperture and is configured to align the acoustic liner and the retaining ring, and restrict rotational and translational motion between the inlet case and the fan case, during assembly.

A method is disclosed of assembling an inlet case and a fan case of a gas turbine engine, including: guiding the inlet case toward the fan case; and guiding an aft end of an acoustic liner that is connected to the inlet case until the aft end of the acoustic liner engages a retaining ring that is bonded to or formed as part of an inner surface of the fan case and is spaced apart from the forward end of the fan case.

In addition to one or more of the disclosed features for the method, the method includes filling a gap formed between the aft end of the acoustic liner and the retaining ring with bonding compound.

In addition to one or more of the disclosed features for the method, guiding the inlet case toward the fan case includes inserting a guide pin through an aft flange of the inlet case and a forward flange of the fan case and thereafter moving the inlet case toward the fan case.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
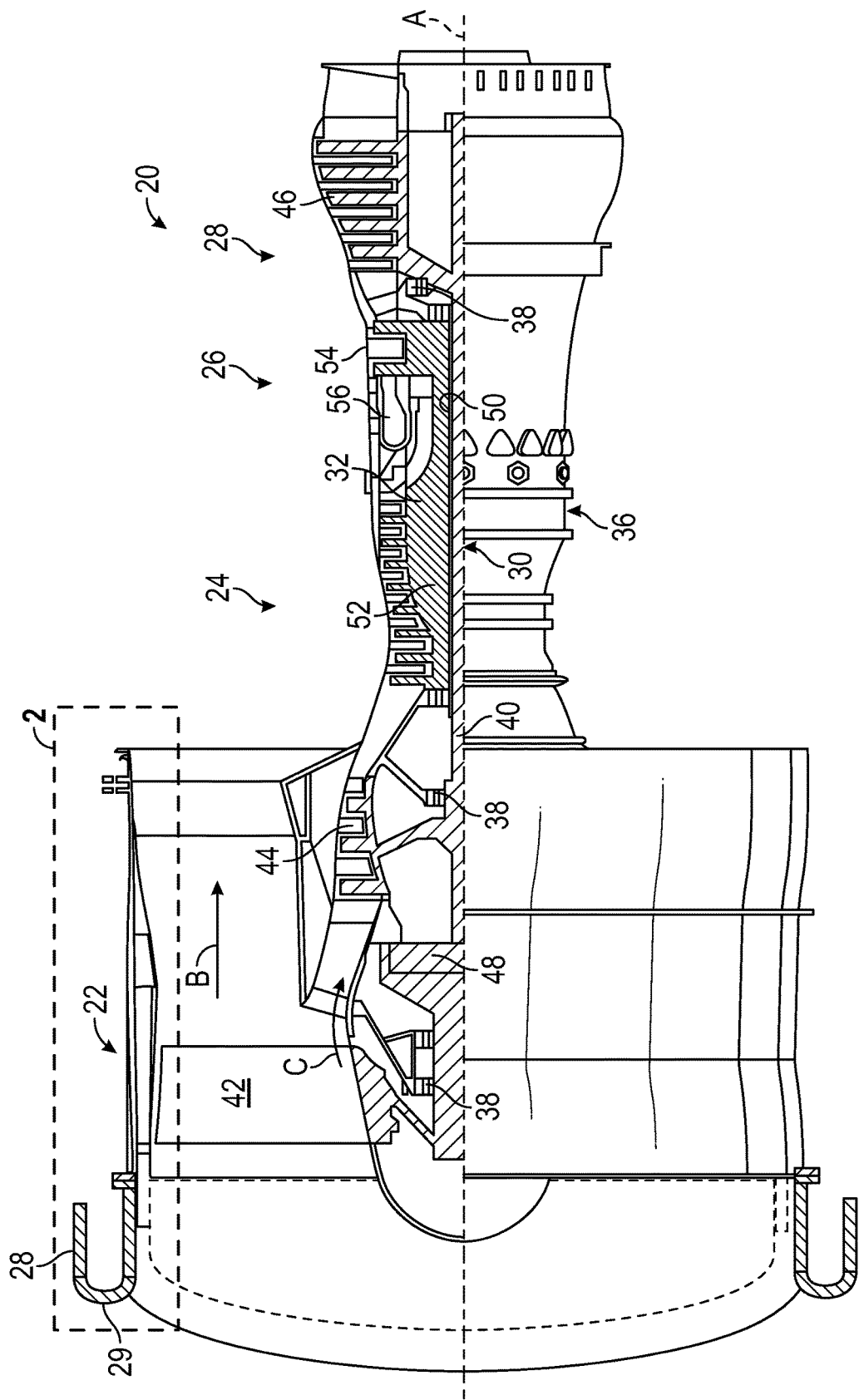
FIG. 1 is a partial cross-sectional view of a gas turbine engine, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. A nacelle 28 surrounds the fan section 22. A forward end of the nacelle 28 defines a nose 29 of the nacelle 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
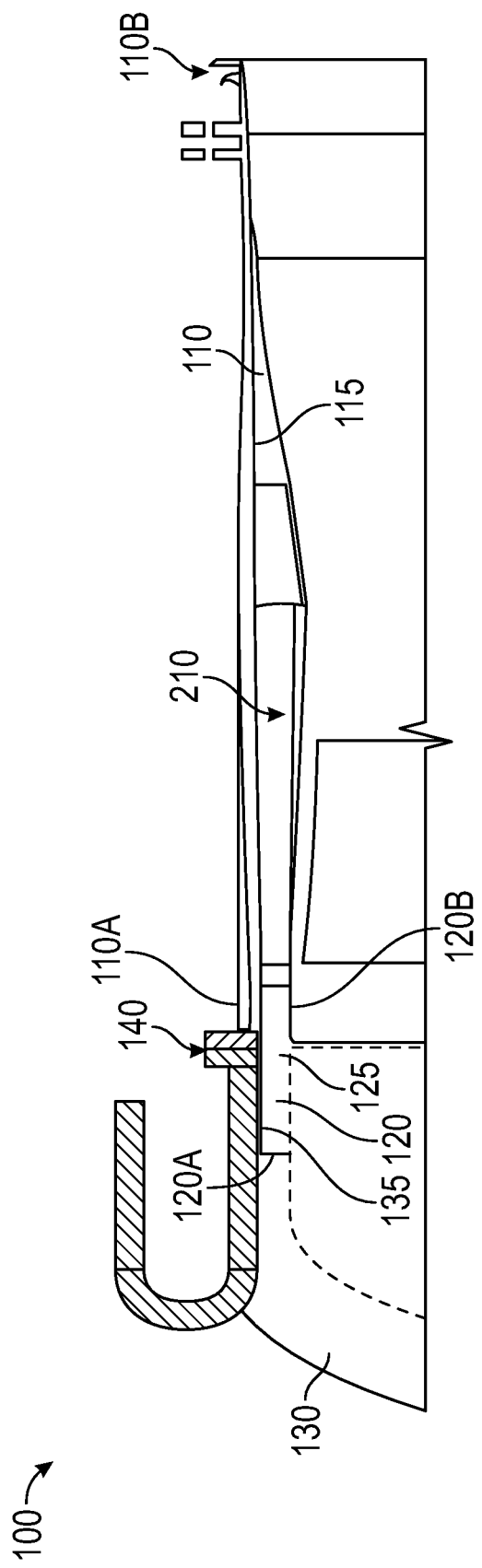
FIG. 2 is a detail of a portion of FIG. 1, and shows an acoustic liner extending between the inlet case and fan case.

As shown in FIG. 2, an assembly 100 is provided for the gas turbine engine 20. The assembly 100 includes the fan case 110. The fan case 110 has a forward end 110A, an aft end 110B, and an inner surface 115 extending from the forward end 110A of the fan case 110 to the aft end 110B of the fan case 110. An acoustic liner 120 is shown. The acoustic liner 120 has a forward end 120A, an aft end 120B, and an acoustic liner body 125 that is elongated and extends continuously from the forward end 120A of the acoustic liner 120 to the aft end 120B of the acoustic liner 120. An inlet case 130 is also shown. The inlet case 130 is located forward of the forward end 110A of the fan case 110. The forward end 120A of the acoustic liner 120 is secured to the inlet case 130. The securing implements may be welds, fasteners, adhesives or other such securing implements. The acoustic liner body 125 is positioned against an inner surface 135 of the inlet case 130 and an inner surface 115 of the fan case 110. The aft end 120B of the acoustic liner 120 is secured to the fan case 110 between the forward end 110A of the fan case 110 and the aft end 110B of the fan case 110. As shown in the figure, the aft end 120B of the acoustic liner 120 is located so that it is spaced apart from the forward end of the fan case 110.

As indicated, the acoustic liner 120 continuously extends between the fan case 110 and the inlet case 130. With this configuration, disruptions in acoustic damping between the cases 110, 120 is reduced compared with segmented liners that terminate at a boundary 140 between the cases 110, 120. The continuous configuration of the acoustic liner 120 also reduces airflow disturbances that are created by edges of the segmented liners.

Figure 3:
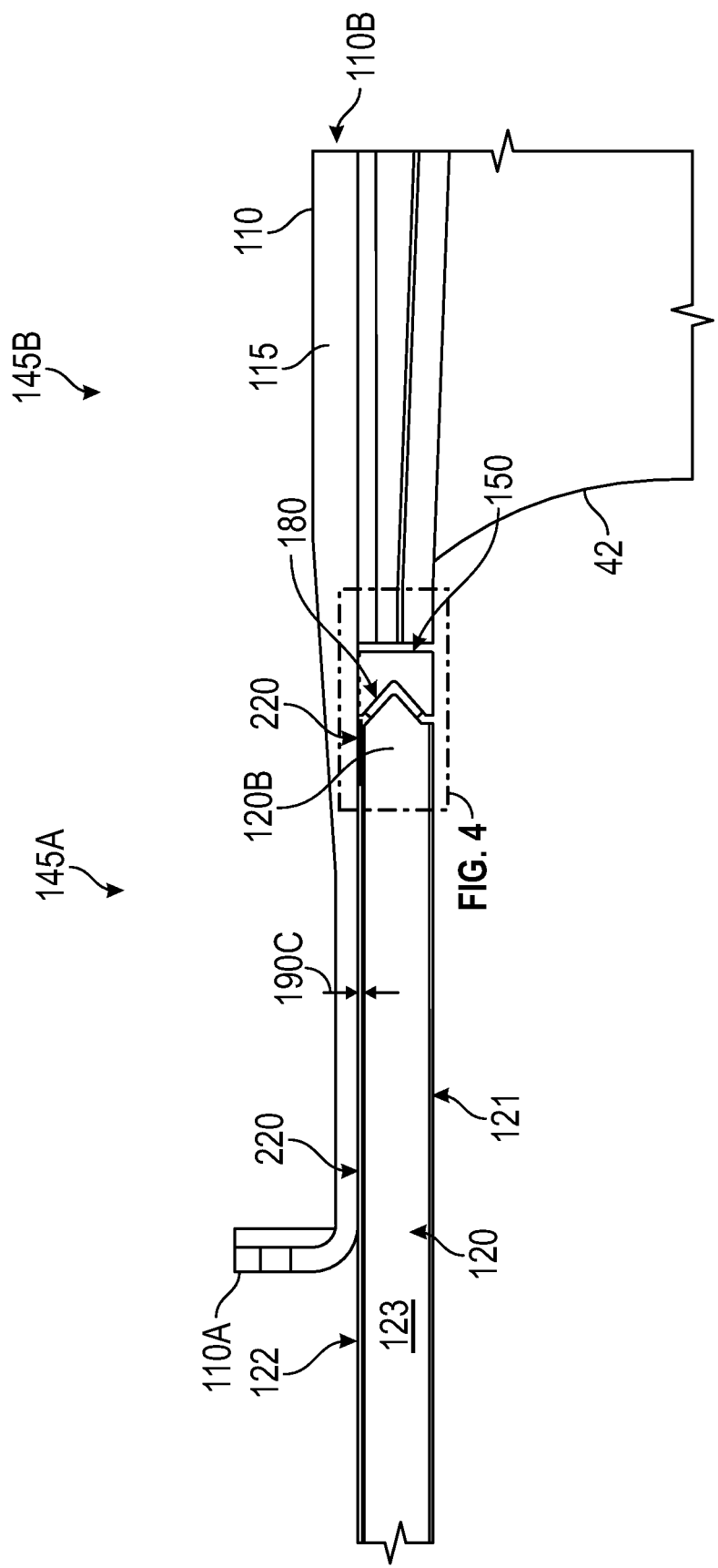
FIG. 3 shows additional aspects of the acoustic liner and the fan case.

Turning to FIG. 3, in one embodiment the acoustic liner 120 is a cartridge liner having a face sheet 121 and a backing sheet 122 that are spaced apart from each other. An acoustic substrate 123 may be disposed between the face and backing sheets 121, 122.

The inner surface 115 of the fan case 110 defines a forward portion 145A of the fan case 110 and an aft portion 145B of the fan case 110. The forward portion 145A of the fan case 110 is axially forward of the fan 42 that is surrounded by the fan case 110. The forward portion 145A of the fan case 110 extends toward the forward end 110A of the fan case 110. The aft portion 145B of the fan case 110 is axially aligned with the fan 42 and extends toward the aft end 110B of the fan case 110. Within the fan case 110, the acoustic liner 120 is located in the forward portion 145A.

A retaining ring 150 is connected to the inner surface 115 of the fan case 110. In one embodiment, the retaining ring 150 is bonded to the inner surface 115 of the fan case 110. In another embodiment, the fan case 110 and retaining ring 150 are a unitary structure formed of a composite. The retaining ring 150 is located in the forward portion 145A of the fan case 110, adjacent to the aft portion 145B of the fan case and spaced apart from the forward end 110A of the fan case 110. The aft end 120B of the acoustic liner 120 and the retaining ring 150 engage each other to restrict motion of the aft end 120B of the acoustic liner 120. With the use of the retaining ring 150, the aft end of the acoustic liner 120 does not need to be secured via welds, fasteners, adhesives or the like.

It is to be appreciated that the retaining ring 150 could be located in the inlet case 130 rather than the fan case 110. In such embodiment, the aft end 120B of the acoustic liner 120 could be fixed to the fan case 110 while the forward end 120A of the acoustic liner is secured via the retaining ring 150. That is, the opposite configuration of the illustrated embodiment is within the scope of the disclosure.

Figure 4:
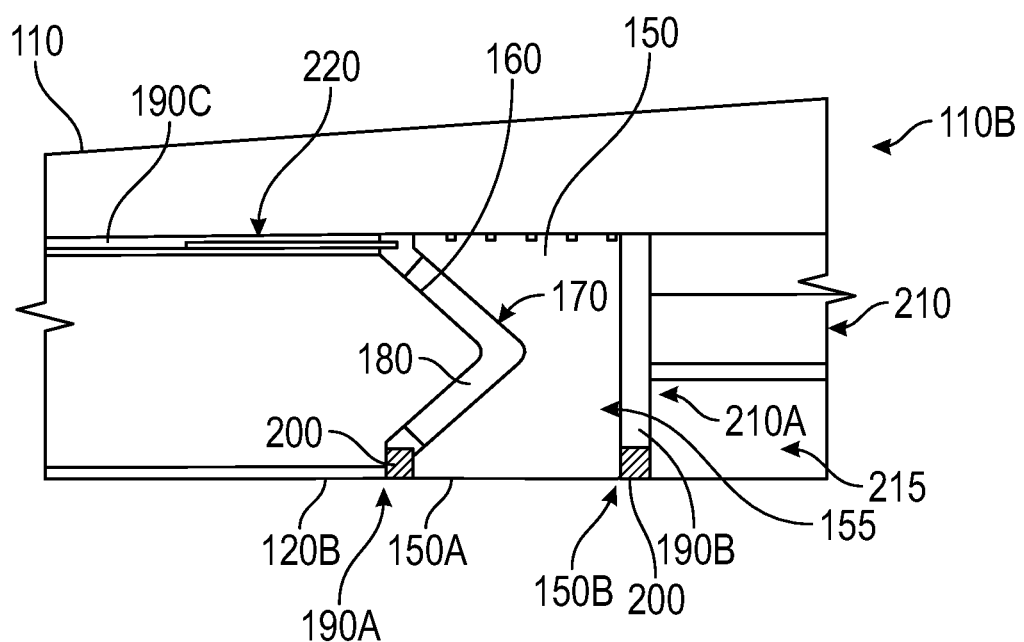
FIG. 4 is a detail of a portion of FIG. 3, and shows additional aspects of the acoustic liner, the fan case, and a retaining ring that is attached or bonded to the fan case and engages an aft end of the acoustic liner.

Turning to FIG. 4, the aft end 120B of the acoustic liner 120 has an end surface 160 that defines a lead-in chamfer via a frustoconical shape with an aft taper. The retaining ring 150 has a forward end 150A, and a retaining ring body 155 that extends from the forward end 150A of the retaining ring 150 to an aft end 150B of the retaining ring 150. The forward end 150A of the retaining ring 150 has a retaining ring groove 170 with a frustoconical shape that is configured to receive the aft end 120B of the acoustic liner 120. That is, the retaining ring groove 170 has a shape that is complementary to the shape of the aft end 120B of the acoustic liner 120. The conical shape enables the retaining ring 150 to function as a guide to the acoustic liner 120, e.g., in situations where the alignment between the retaining ring 150 and the acoustic liner 120 may be slightly skewed during assembly.

A damper 180 is bonded to the retaining ring groove 170. The damper 180 is disposed between the retaining ring groove 170 and the aft end 120B of the acoustic liner 120. The damper 180 may prevent damage or separation of the retaining ring 150 and the acoustic liner 120 that could result from vibrations during operation of the engine 20 (FIG. 1).

A forward gap 190A may be defined between the aft end 120B of the acoustic liner 120 and the damper 180. The forward gap 190A may be formed due to a length of the acoustic liner 120 being slightly undersized, end to end, though within design tolerances. A potting compound 200 may be utilized to fill the forward gap 190A, to provide for a smooth airflow over the forward gap 190A.

A rub strip 210 is connected to the inner surface 115 of the fan case 110. The rub strip 210 has a forward end 210A and a rub strip body 215 that extends to the aft end of the fan case 110. The retaining ring 150 is axially adjacent to the forward end 210A of the rub strip 210. Due to positioning tolerances, this configuration may result in forming an aft gap 190B between the rub strip 210 and the retaining ring 150. The potting compound 200 may be utilized to fill the aft gap 190B, to provide for a smooth airflow over the forward gap 190A.

As shown in FIGS. 3 and 4, spacer shims 220 may be disposed between the acoustic liner 120 and the inner surface 115 of the fan case 110. This configuration may define a radial gap 190C between the acoustic liner 120 and the inner surface 115 of the fan case 110. In one embodiment, the spacer shims 220 are axially discrete and axially spaced apart from each other along the acoustic liner 120. The spacer shims 220 reduce a contact surface area between the acoustic liner 120 and the fan case 110. This configuration reduces contact friction between the acoustic liner 120 and the fan case 110 while the inlet case 130 is being moved into place against the fan case 110 and the acoustic liner 120 slides against the inner surface 115 of the fan case. The spacer shims 220 may also provide for damping vibrations that could otherwise occur due to an out-of-roundness shape of the acoustic liner 120.

Figure 5:
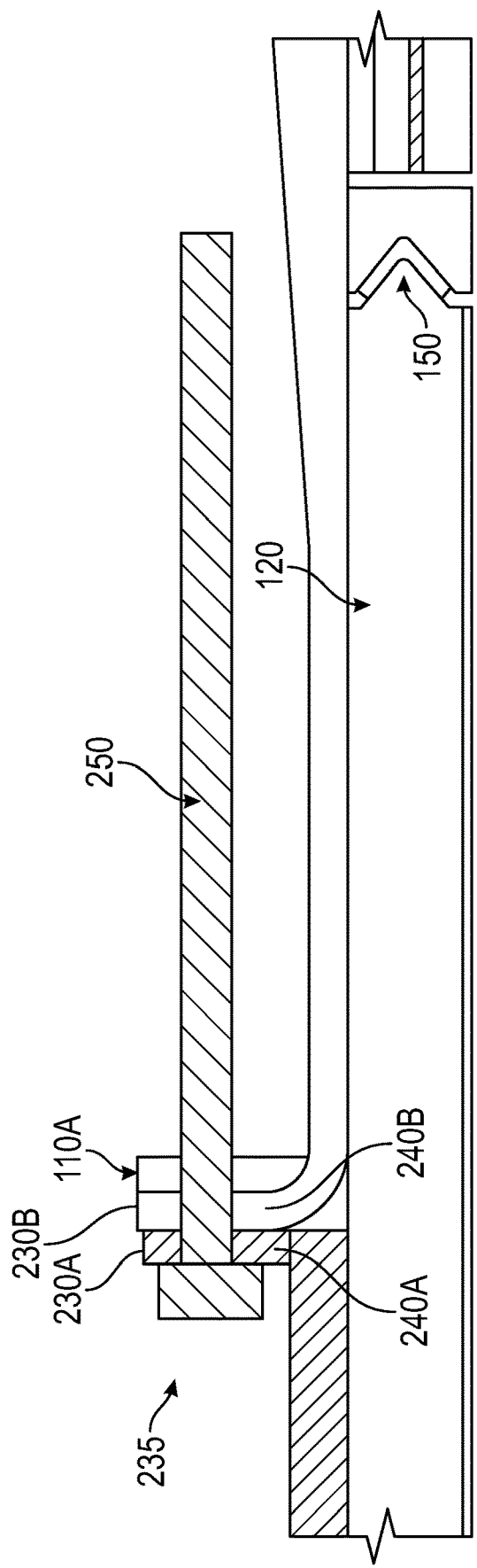
FIG. 5 shows a guide pin that is configured to guide the inlet case toward the fan case while the aft end of the acoustic liner is guided toward the retaining ring, according to an embodiment.

Turning to FIG. 5, the aft end 235 of the inlet case 130 defines an aft flange 230A. The aft flange 230A may have an aft guide aperture 240A. The forward end 110A of the fan case 110 defines a forward flange 230B. The forward flange 230B may have a forward guide aperture 240B. A guide pin 250 may extend through the aft guide aperture 240A and the forward guide aperture 240B. In the figure, the head of the guide pin 250 is against the inlet case 130 via the aft flange 230A and the body of the guide pin 250 extends along the fan case 110. However, the guide pin 250 could be directionally reversed so that the head of it is against the forward end 110A of the fan case 110 and the body of the guide pin 250 extends along the inlet case 130. In practice a length of the guide pin 250 and the configuration of the outer nacelle flowpath of the inlet and fan case may direct the directional orientation of the guide pin 250. During assembly of the inlet case 130 and fan case 110, the guide pin 250 may be utilized to align the acoustic liner 120 and the retaining ring 150. This configuration may restrict rotational and translational motion between the inlet case 130 and the fan case 110 during assembly.

Figure 6:
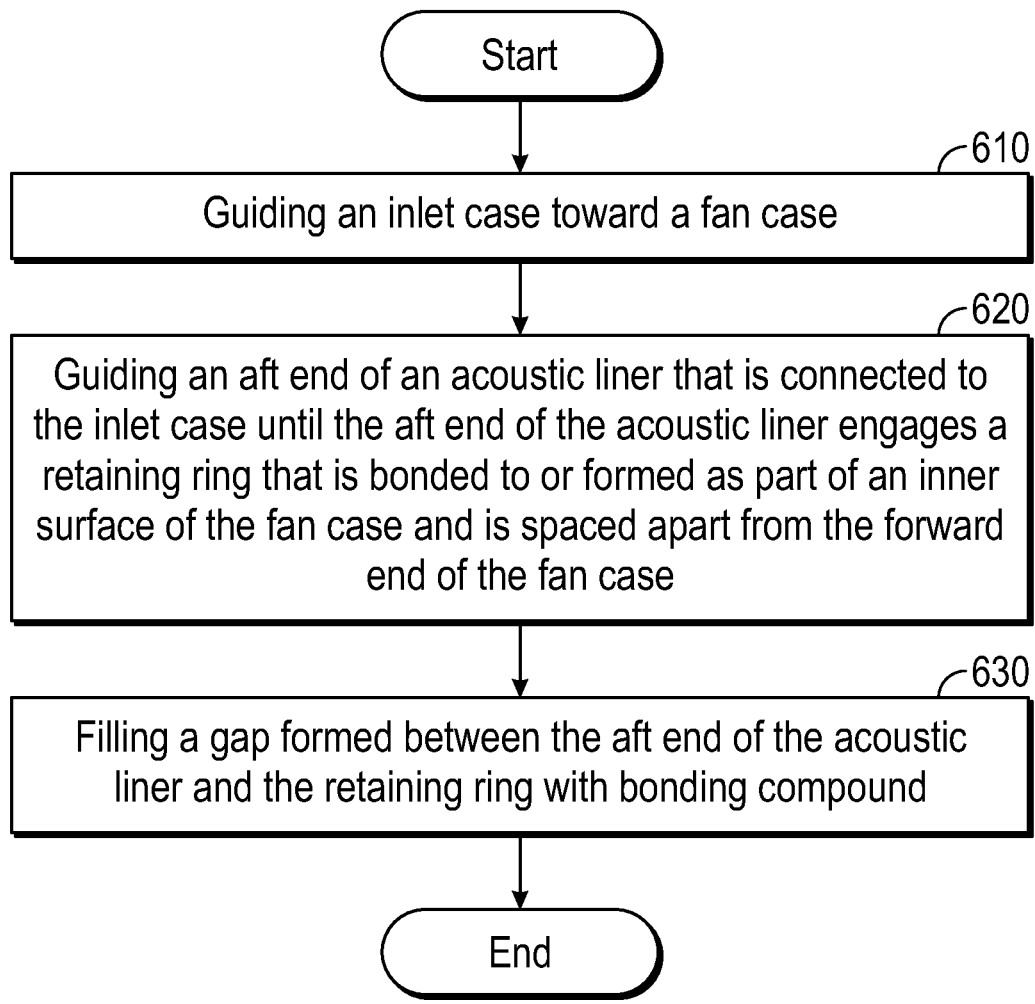
FIG. 6 shows a method of assembling an inlet case with a fan case, according to an embodiment.

Turning to FIG. 6, a flowchart shows a method of assembling the inlet case 130 with the fan case 110. As shown in block 610, the method includes guiding the inlet case 130 toward the fan case 110. As shown in block 620 the method includes guiding the at aft end 120B of the acoustic liner 120 that is connected to the inlet case 130 until the acoustic liner aft end engages a retaining ring 150 that is bonded to or formed as part of the inner surface 115 of the fan case 110 and is spaced apart from the forward end 110A of the fan case 110. As shown in block 630, the method includes filling a gap 190A (referred to above as the forward gap 190A) formed between the aft end 120B of the acoustic liner 120 and the retaining ring 150 with bonding compound 200. According to an embodiment, guiding inlet case 130 toward the fan case (block 610) includes inserting a guide pin 250 through an aft flange 240A of the inlet case 130 and a forward flange 240B of the fan case 110 and thereafter moving the inlet case 130 toward the fan case 110. This configuration may restrict rotational and translational motion between the inlet case 130 and the fan case 110 during assembly so that the acoustic liner 120 more readily engages the retaining ring 150.

The embodiments provide an acoustic liner that extends between the inlet case and the fan case and thus provides an acoustic treatment continuously between the cases. Such treatment has the beneficial result of reducing fan noise and reducing flow path disruptions between the inlet case and the fan case that can cause aerodynamic loses. The embodiments also include a securing feature in the form of a retaining ring that enables locating and securing the aft end of the acoustic liner.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for a gas turbine engine, comprising:
a fan case having a forward end, an aft end, and an inner surface extending from the forward end of the fan case to the aft end of the fan case;
an acoustic liner having a forward end, an aft end, and an acoustic liner body that extends continuously from the forward end of the acoustic liner to the aft end of the acoustic liner;
an inlet case located forward of the forward end of the fan case,
the forward end of the acoustic liner being secured to the inlet case, and
wherein the acoustic liner body is positioned against an inner surface of the inlet case and the inner surface of the fan case, and the aft end of the acoustic liner is secured to the fan case between the forward end and the aft end of the fan case;
the inner surface of the fan case defines a forward portion and an aft portion,
wherein the forward portion of the inner surface of the fan case extends toward the forward end of the fan case and is axially forward of a fan that is surrounded by the fan case, and the aft portion of the fan case extends toward the aft end of the fan case and is axially aligned with the fan; and
a retaining ring is connected to the inner surface of the fan case in the forward portion of the fan case,
wherein the aft end of the acoustic liner and the retaining ring engage each other to restrict motion of the aft end of the acoustic liner;
the aft end of the acoustic liner has an end surface that defines a lead-in chamfer via a frustoconical shape having an aft taper; and
the retaining ring has a forward end, and a retaining ring body that extends from the forward end of the retaining ring to an aft end of the retaining ring, wherein the forward end of the retaining ring has a retaining ring groove with a frustoconical shape that is configured to receive the aft end of the acoustic liner, wherein that the retaining ring groove defines a V-shape rotated on its side when viewed from a cross-section of the retaining ring, and the end surface of the aft end of the acoustic liner has a corresponding V-shape rotated on its side when viewed from a cross-section of the acoustic liner, whereby the aft end of the acoustic liner is configured for being received in the retaining ring groove;

wherein the inlet case and fan case include connecting flanges, which include an aft flange of the inlet case and a forward flange of the fan case, by which the inlet case and fan case connect with each other, and wherein: (i) the retaining ring is connected to the fan case aft of the connecting flanges; (ii) the acoustic liner body is continuous adjacent to the connecting flanges; and (iii) the fan case, aft of the forward end of the fan case, is continuous adjacent to the acoustic liner body; and wherein the retaining ring body has a block shaped cross section defined by the forward end having the retaining ring groove, an aft end that is axially spaced from the forward end, an outer end that is against the inner surface of the fan case, and an inner end that is radially spaced from the outer end, wherein the inner and outer ends are planar and extend axially by a same distance between the forward and aft ends, and the aft end is planar and extends radially between the inner and outer ends; and an apex of the V-shape of the retaining ring groove is at a radial center of the retaining ring groove;

wherein the aft end of the acoustic liner has a cross section shape that is complementary to the forward and of the retaining ring body to thereby define an outwardly extending V-shape contour having an apex at a radial center of the aft end of the acoustic liner.

2. The assembly of claim 1, wherein:
a damper is bonded to the retaining ring groove and disposed between the retaining ring groove and the aft end of the acoustic liner.

3. The assembly of claim 2, wherein:
a forward gap is defined between the aft end of the acoustic liner and the damper; and
a potting compound is disposed in the forward gap, to thereby fill the forward gap.

4. The assembly of claim 3, comprising:
a rub strip is connected to the inner surface of the fan case, the rub strip including a forward end, and a rub strip body that extends to the aft end of the fan case;
the retaining ring is axially adjacent to the forward end of the rub strip,
wherein an aft gap is defined between the retaining ring and the forward end of the rub strip; and
the potting compound is disposed in the aft gap, to thereby fill the aft gap.

5. The assembly of claim 1, wherein:
the retaining ring is bonded to the fan case; or the fan case and retaining ring are a unitary structure formed of a composite.

6. The assembly of claim 1, wherein:
spacer shims are disposed between the acoustic liner and the fan case to define a radial gap between the acoustic liner body and the fan case; and
the spacer shims are axially discrete and axially spaced apart from each other along the acoustic liner.

7. The assembly of claim 1, wherein the retaining ring is formed integral with or bonded to the inner surface of the fan case.

8. A gas turbine engine, comprising:
a fan;
a fan case that surrounds the fan, the fan case having a forward end, an aft end, and an inner surface extending from the forward end of the fan case to the aft end of the fan case;
an acoustic liner having a forward end, an aft end, and an acoustic liner body that extends continuously from the forward end of the acoustic liner to the aft end of the acoustic liner;
an inlet case located forward of the forward end of the fan case, the forward end of the acoustic liner being secured to the inlet case, and
wherein the acoustic liner body is positioned against an inner surface of the inlet case and the inner surface of the fan case, and the aft end of the acoustic liner is secured
to the fan case between the forward end and the aft end of the fan case; the inner surface of the fan case defines a forward portion and an aft portion,
wherein the forward portion of the inner surface of the fan case extends toward the forward end of the fan case and is axially forward of a fan that is surrounded by the fan case, and the aft portion of the fan case extends toward the aft end of the fan case and is axially aligned with the fan; and
a retaining ring is connected to the inner surface of the fan case in the forward portion of the fan case,
wherein the aft end of the acoustic liner and the retaining ring engage each other to restrict motion of the aft end of the acoustic liner;
the aft end of the acoustic liner has an end surface that defines a lead-in chamfer via a frustoconical shape having an aft taper; and
the retaining ring has a forward end, and a retaining ring body that extends from the forward end of the retaining ring to an aft end of the retaining ring, wherein the forward end of the retaining ring has a retaining ring groove with a frustoconical shape that is configured to receive the aft end of the acoustic liner,
wherein that the retaining ring groove defines a V-shape rotated on its side when viewed from a cross-section of the retaining ring, and the end surface of the aft end of the acoustic liner has a corresponding V-shape rotated on its side when viewed from a cross-section of the acoustic liner, whereby the aft end of the acoustic liner is configured for being received in the retaining ring groove;
wherein the inlet case and fan case include connecting flanges, which include an aft flange of the inlet case and a forward flange of the fan case, by which the inlet case and fan case connect with each other, and wherein: (i) the retaining ring is connected to the fan case aft of the connecting flanges; (ii) the acoustic liner body is continuous adjacent to the connecting flanges; and (iii) the fan case, aft of the forward end of the fan case, is continuous adjacent to the acoustic liner body; and
wherein the retaining ring body has a block shaped cross section defined by the forward end having the retaining ring groove, an aft end that is axially spaced from the forward end, an outer end that is against the inner surface of the fan case, and an inner end that is radially spaced from the outer end, wherein the inner and outer ends are planar and extend axially by a same distance between the forward and aft ends, and the aft end is planar and extends radially between the inner and outer ends; and an apex of the V-shape of the retaining ring groove is at a radial center of the retaining ring groove;

wherein the aft end of the acoustic liner has a cross section shape that is complementary to the forward and of the retaining ring body to thereby define an outwardly extending V-shape contour having an apex at a radial center of the aft end of the acoustic liner.

9. The engine of claim 8, wherein:

a damper is bonded to the retaining ring groove and disposed between the retaining ring groove and the aft end of the acoustic liner.

10. The engine of claim 9, wherein:

a forward gap is defined between the aft end of the acoustic liner and the damper; and a potting compound is disposed in the forward gap, to thereby fill the forward gap.

11. The engine of claim 10, comprising:

a rub strip is connected to the inner surface of the fan case, the rub strip including a forward end, and a rub strip body that extends to the aft end of the fan case;

the retaining ring is axially adjacent to the forward end of the rub strip, wherein an aft gap is defined between the retaining ring and the forward end of the rub strip; and the potting compound is disposed in the aft gap, to thereby fill the aft gap.

12. The engine of claim 8, wherein:

the retaining ring is bonded to the fan case; or the fan case and retaining ring are a unitary structure formed of a composite.

13. The engine of claim 8, wherein:

spacer shims are disposed between the acoustic liner and the fan case to define a radial gap between the acoustic liner body and the fan case; and the spacer shims are axially discrete and axially spaced apart from each other along the acoustic liner.

14. The engine of claim 8, wherein the retaining ring is formed integral with or bonded to the inner surface of the fan case.

* * * * *